United States Patent [19]

Rowlands

[11] 4,374,209
[45] Feb. 15, 1983

[54] POLYMER-MODIFIED POLYOLS USEFUL IN POLYURETHANE MANUFACTURE

[75] Inventor: Jeffrey P. Rowlands, Jona S. Gallen, Switzerland

[73] Assignee: Interchem International S.A., Luxembourg

[21] Appl. No.: 258,620

[22] Filed: Apr. 29, 1981

Related U.S. Application Data

[63] Continuation-in-part of Ser. No. 208,633, Nov. 20, 1980, abandoned.

[30] Foreign Application Priority Data

Oct. 1, 1980 [GB] United Kingdom ................ 8031649
Feb. 2, 1981 [GB] United Kingdom ................ 8103105

[51] Int. Cl.$^3$ .............................................. C08G 18/14
[52] U.S. Cl. .................................... 521/116; 252/182; 521/164; 521/167; 525/409; 524/762; 528/48; 528/76
[58] Field of Search ............ 521/116, 164, 167; 252/182; 260/33.2 R; 525/409; 528/48, 76; 524/762

[56] References Cited

U.S. PATENT DOCUMENTS

| 2,929,800 | 3/1960 | Hill | 260/33.2 R |
| 3,135,707 | 6/1964 | Nyquist et al. | 528/76 |
| 3,356,650 | 12/1967 | McElroy | 528/76 |
| 3,360,495 | 12/1967 | Muller et al. | 260/33.2 |

FOREIGN PATENT DOCUMENTS

| 924878 | 5/1963 | United Kingdom . |
| 1453258 | 10/1976 | United Kingdom . |
| 1482213 | 8/1977 | United Kingdom . |
| 1501172 | 2/1978 | United Kingdom . |
| 1553760 | 10/1979 | United Kingdom . |
| 1571183 | 7/1980 | United Kingdom . |
| 1571184 | 7/1980 | United Kingdom . |

Primary Examiner—Maurice J. Welsh
Attorney, Agent, or Firm—Fleit, Jacobson & Cohn

[57] ABSTRACT

A polymer-modified polyol is formed by polymerizing an olamine, particularly an alkanolamine, with an organic polyisocyanate in the presence of a polyol. The alkanolamine reacts polyfunctionally with the polyisocyanate to produce polyaddition products.

The polyaddition products may constitute a stable dispersion in the polyol and the resulting polymer-modified polyol is particularly useful as a polyol starting material for reaction with a polyisocyanate in the manufacture of polyurethane foam.

29 Claims, No Drawings

POLYMER-MODIFIED POLYOLS USEFUL IN POLYURETHANE MANUFACTURE

This is a continuation-in-part of application Ser. No. 208,633, filed Nov. 20, 1980, now abandoned.

This invention relates to polymer-modified polyols useful in polyurethane manufacture.

Polyurethane foam is manufactured by reacting a polyol with a polyisocyanate in the presence of a blowing agent and usually also one or more other additives.

In order to modify the physical properties of the resulting foam in a desired manner, it is known to use pre-formed polymer-modified polyols (i.e. polyols containing additional polymeric material) in the polyurethane-forming reaction. Thus, for example, British Pat. No. 1,501,172 describes the use of polyol dispersions of polyaddition products of polyisocyanate and primary amines, secondary amines, hydrazines or hydrazides; and British Pat. No. 1,482,213 describes the use of polyols having dispersed therein and also copolymerised therewith polymeric material derived from the in situ polymerisation of ethylenically unsaturated monomers.

An object of the present invention is to provide further polymer-modified polyols which may be useful in polyurethane manufacture.

According to the invention therefore there is provided a method of forming a polymer-modified polyol wherein an olamine is polymerised with an organic polyisocyanate in the presence of a polyol, the olamine reacting at least predominantly polyfunctionally with the isocyanate.

With the method of the invention, the olamine (by which is meant an organic compound having one or more hydroxyl (—OH) groups and also one or more amine groups whether primary, secondary or tertiary (—NH$_2$, =NH, ≡N) acts as a polyfunctional reactant (having two or more reactive hydrogens) and a polyaddition product is formed with the polyisocyanate (by which is meant a compound having two or more isocyanate groups). Where the olamine is a primary or secondary amine, it has alcohol and amine groups with active hydrogens all of which hydrogens may be reactive with regard to the isocyanate. Where the olamine is a tertiary amine it has multiple alcohol groups with active hydrogens all of which may be reactive with regard to the isocyanate. In each case all or only some of the reactive hydrogens may in fact react. It is believed that the polyaddition reaction produces straight and/or branched chains by combination of isocyanate and hydroxyl groups to form urethane linkages (—NH—CO—O—) and by combination of isocyanate and amine groups to form urea linkages (—NH—CO—NH— or =N—CO—NH—) as appropriate. The said polyaddition product may be mixed and/or chemically combined (as by copolymerisation) with the polyol and it is to be understood that the term polymer-modified polyol as used herein is intended to encompass both physical and chemical combinations and also mixtures thereof, although it is believed that, most usually, the method of the invention will result in a predominantly physical combination. Such physical combination may be in the form of a solution or a stable dispersion of the polyaddition product in the polyol depending on the starting materials used. In particular, the choice of the olamine and possibly also the polyol may determine the physical state of the polymer-modified polyol.

Most preferably, with the method of the invention, the olamine and the isocyanate are mixed in the molar ratio of about 1.0/0.5 to 1.0/1.5 in the presence of a polyether polyol having a molecular weight in the range 200 to 10,000 (particularly 2800-7000) and the reacted olamine and polyisocyanate together constitute 1% to 35% by weight based on the weight of the polyol.

Any suitable alkanolamine or combination of alkanolamines may be used as the olamine of the present invention including but not restricted to primary, secondary and tertiary alkanolamines such as Monoethanolamine, diethanolamine, triethanolamine, N-Methylethanolamine, N-Ethylethanolamine, N-Butylethanolamine, N-Methyldiethanolamine, N-Ethyldiethanolamine, N-Butyldiethanolamine, Monoisopropanolamine, Diisopropanolamine, Triisopropanolamine, N-Methylisopropanolamine, N-Ethylisopropanolamine, N-Propylisopropanolamine. The term alkanolamine as used herein includes substituted alkanolamines and, for example, it is also possible to use primary and secondary alkanolamines which are halogen substituted at the nitrogen atom, or secondary or tertiary alkanolamines which are halogen substituted at the alkyl group (i.e. the alcohol group replaced by a halogen atom). In a particularly preferred embodiment, triethanolamine is used as the alkanolamine.

Whilst it is visualised that the method of the present invention will most usually utilise an alkanolamine, particularly an open chain aliphatic alkanolamine, as the olamine it is to be understood that it may also be possible to use other olamine compounds which have hydroxyl and amine groups attached to carbo-cyclic, aromatic or heterocyclic nuclei or combinations thereof with each other and/or with open chain aliphatic nuclei.

Any suitable organic polyisocyanate may be used including aliphatic, cycloaliphatic, araliphatic, aromatic and heterocyclic polyisocyanates such as are known for use in the polyisocyanate/polyol polyurethane forming reaction (see for example British Pat. No. 1,453,258).

Suitable commercially readily available polyisocyanates include 2,4 and 2,6 tolylene diisocyanates also mixtures of these isomers (called in general TDI), polyphenyl polymethylene polyisocyanates of the type obtained by condensing aniline with formaldehyde, followed by phosgenation (called in general crude MDI), and polyisocyanates containing carbodiimide groups, urethane groups, allophonate groups, isocyanate groups, urea groups or biuret groups (called in general polyisocyanates).

Any suitable polyol may be used including polyether polyols having a molecular weight in the range of 200 to 10,000 such as are known for use in the polyisocyanate/polyol polyurethane forming reaction and as described for example in British Pat. No. 1,482,213. Such known polyether polyols can be obtained by reaction of alkeylene oxides with active hydrogen containing compounds, the molecular weight of the reaction product depending on the amount of alkylene oxide reacted.

The polyaddition products obtained according to the present invention may be modified by the proportionate use of monofunctional isocyanates, amines or N-dialkylalkanolamines. For example, the average molecular weight of the polyaddition products may be adjusted by incorporating monofunctional compounds of this type in proportions of up to 25 mole percent based upon the olamine component.

Suitable monofunctional isocyanates include methyl, ethyl, isopropyl, hexyl, lauryl, and stearyl isocyanate, cyclohexyl isocyanate, phenyl isocyanate, tolylisocyanate 4-chlorophenyl isocyanate and diisopropyl phenyl isocyanate.

Suitable monofunctional amines include dialkylamines such as dimethylamine, diethylamine, dibutylamine, cyclohexylamine, and suitable N-dialkylalkanolamines include dimethylethanolamine and diethylethanolamine.

It is to be understood that not all alcohol/amine groups of the olamine used in the polyaddition reaction of the invention need react in all circumstances with the isocyanate and thus the olamine may react monofunctionally in some instances thereby to act in itself as a chain terminator.

If desired, the polyaddition reaction of the present invention can be catalysed by introduction of substances such as those conventionally used as catalysts in the polyisocyanate/polyol polyurethane forming reaction. Thus organometallics such as stannous octoate and dibutyl tin dilaurate and/or amines such as triethylenediamine can be used. The amount of catalyst used may be small in relation to that normally used in the polyurethane forming reaction, for example or the order of 0.02% rather than 0.2% of the total weight of polyol, although larger amounts may also be used if desired.

The reaction using a primary or secondary alkanolamine may not require catalysis but this may be advantageous with a tertiary alkanolamine such as triethanolamine.

The molecular weight of the polyaddition product may be adjusted by varying the quantitative ratio between the olamine on the one hand and the polyisocyanate on the other hand (and by monofunctional components if they are used). Thus, for example, although a molar ratio of olamine to polyisocyanate of 1.0/0.5 to 1.0/1.5 is preferred and substantially equivalent molar quantities are particularly preferred, it is possible to use a higher proportion of isocyanate if appropriate allowance can be made for the higher viscosity or even rapid gellation which tends to occur at higher isocyanate levels. An upper ratio of say 1.0/1.55 or 1.0/1.6 may thus be possible. As the quantity of isocyanate is reduced the molecular weight of the polyaddition product also decreases together with the viscosity. In general an olamine/organic polyisocyanate molar ratio of 1.0/0.8 to 1.0/1.1 is preferred.

It is even possible substantially to exceed the above mentioned upper ratio limit of 1 to 1.6 if a "capping" agent is introduced to limit cross-linking and hence gellation. Thus, although it may normally be preferable to utilise reaction conditions which result in bifunctional reaction of the olamine with the isocyanate, in some circumstances and with some olamines, particuarly triethanolamine, it may be preferable to obtain trifunctional reaction of the olamine with the isocyanate thereby to ensure that there are substantially no free hydroxyl groups which could undesirably interfere with a subsequent polyurethane-forming reaction using the polymer-modified polyol. In this latter case an olamine/isocyanate ratio of up to say 1.0/2.1 or higher may be desirable and a capping agent (say N-dimethylethanolamine) may be added (say in an olamine/capping agent ratio of 1.0/1.2) to limit cross-linking.

Although the concentration of the reacted olamine and isocyanate (and hence the polyaddition products) in the polyether polyol may vary within wide limits it should generally be between 1 and 35% by weight, preferably from 3 to 30% by weight. Where a specific concentration of polyaddition product is required (for example for use in the manufacture of polyurethane foams having certain optimal properties a concentration of about 10% by weight may be required) this may be obtained directly by appropriate selection of the reactants to give the required concentration or alternatively by subsequent dilution of a formed polyaddition product with additional polyether polyol as appropriate.

In general the reactants may be mixed at temperatures from 0° C., or above their melting points, whichever may be lower, up to 150° C. Preferably the reactants are mixed at room temperature or just above their melting points, whichever may be lower, up to 70° C. It may also be possible to mix the reactants below their melting points.

The reaction is exothermic and a temperature rise is observed according to the proportion of polyaddition product made, based upon the weight of the polyether polyol.

The more efficient the mixing of the reactants the finer the particle size of the dispersion (where a dispersion is produced) and the lower the viscosity. Although a simple batch process may be used, whereby one of the olamine and polyisocyanate reactants is first of all dissolved or dispersed in the polyether polyol, followed by addition of the other into the zone of maximum agitation, in-line blending of the materials may also be used. In the latter case all reactants are pumped at controlled rates and may be mixed simultaneously or one reactant may be mixed firstly with the polyether polyol followed by addition and mixing of the other reactant.

The dispersion in polyether polyol may be used either immediately after completion of the reaction or after a prolonged period of time. For example, the polyaddition product in a polyether polyol may be metered from an in-line blending unit, where the reaction takes place, directly into the mixing head of a polyurethane production machine, of a well-known type. Where the reaction of the olamine with the polyisocyanate is relatively slow, then an intermediate holding tank may be used between such in-line blending unit and the polyurethane mixing head to allow additional time for complete reaction to take place.

Additives such as activators, stabilizers, crosslinkers, water, blowing agents, flame-proofing agents and pigment pastes, may be added to the polymer-modified polyol of the present invention either during or after reaction.

The polyaddition product of the present invention can be used in the manufacture of polyurethane foam. In the case where the product is in the form of a stable polyol dispersion, that is a dispersion which does not settle out or at least will remain in dispersion during mixing with other foam-forming ingredients, the dispersed polyaddition product is particularly effective as a polymeric filler in the production of highly resilient conveniently processible foam, such dispersed product acting to build strength whilst at the same time rupturing cell walls.

In the case where the product is in the form of a polyol solution, this may be suitable for the use in forming polymeric material having properties different from those obtained with polyol dispersions.

In general, where the polyaddition product is in the form of a stable dispersion, this is suitable for processing into soft, semi-hard and hard polyurethane foams having improved properties, such as increased hardness, and non-shrinking foams of the high resilience type which are well-known in the industry, can be prepared since the polyol dispersed polyaddition product has a cell opening effect. In addition the dispersions are also suitable for the production of for example elastomers, coverings and coatings based on polyurethanes.

Where the dispersion is to be used in making a polyurethane, usually the polyurethane forming process will utilise the polyol of the dispersion and thus the properties of the polyol of the dispersion, particularly its hydroxyl number and functionality, will be selected in known manner in dependence upon the type of polyurethane being made. For example for the preparation of elastomers the polyether polyol will preferably be predominantly linear, i.e. difunctional and will have hydroxyl numbers in the range 30 to 170. For the preparation of foams, the polyether polyols are selected in known manner to give foams which are flexible, semi-flexible or rigid. Thus for the preparation of flexible foams the polyether polyols preferably have hydroxyl numbers in the range 20 to 80 and from 2 to 4 hydroxyl groups per molecule for example ICI Polyol PBA 1233. If desired mixtures of polyether polyols can be used.

Organic polyisocyanates which may be used in making the polyurethanes have been described in the prior art and may be the same as the organic polyisocyanates described above for reaction with the olamine.

The polyurethane foaming reaction mixture may also contain other conventional ingredients of such reaction mixture according to the type of polyurethane being made. Thus, the reaction mixture may contain catalyst, for example tertiary amines and organic tin compounds, cross-linking or chain lengthening agents, for example diethanolamine, triethanolamine, ethylene glycol, glycerol, dipropylene glycol and phenylene diamine, flameproofing agents, for example halogenated alkyl phosphates and fillers for example barium sulphate.

For the preparation of foams, blowing agents are included in the reaction mixture. Examples of suitable blowing agents include water which reacts with the polyisocyanate forming carbon dioxide and inert volatile liquids which vapourise under the influence of the exothermic reaction or due to the release of pressure if a mechanical frothing process is used. Examples of such liquids are halogenated hydrocarbons having boiling points not exceeding 100° C. at atmospheric pressure and preferably not exceeding 50° C., especially chlorofluorinated hydrocarbons such as trichlorofluoromethane and dichlorodifluoromethane also chlorinated hydrocarbons such as dichloromethane. The amount of blowing agent is selected in known manner to provide foams of the desired density. In general from 0.005 to 0.3 mole of gas per 100 grams of reaction mixture is suitable. If desired, the density of the foam produced can be modified by over-packing, that is to say foaming the reaction mixture in a closed mould having a volume less than that which would be occupied by the resultant foam if the reaction mixture were allowed to rise freely.

In general, the composition of the polyurethane-forming reaction mixture should be such that the ratio of isocyanate groups to activate hydrogen atoms is substantially within the range 0.9/1 to 1.2/1 but higher ratios may be used if desired.

When a polyurethane foam is prepared it is usually necessary to stabilize or regulate the cells which are formed by the addition of a foam stabilizer or cell regulator such as polysiloxane—polyalkylene oxide block copolymers which may contain direct carbon to silicon or carbon to oxygen to silicon bonds between the organic and polysiloxane units. When producing 'high resilience' polyurethane foams then dimethyl silicone oils or low molecular weight modifications thereof are satisfactory, for example Theodore Goldschmidt AG silicone B8616.

One shot, prepolymer or quasi prepolymer methods may be employed as may be appropriate for the particular type of polyurethane being made.

The components of the polyurethane forming reaction mixture may be mixed together in any convenient manner, for example by using any of the mixing equipment described in the prior art for the purpose. If desired, some of the individual components may be pre-blended so as to reduce the number of component streams requiring to be brought together in the final mixing step. It is often convenient to have a two-stream system whereby one stream comprises a polyisocyanate or prepolymer and the second stream comprises all the other components of the reaction mixture.

The invention is illustrated but not limited by the following Examples in which all parts are by weight and percentages by weight. Unless otherwise stated ambient temperatures were used for reactants.

The abbreviations used in the Examples for the polyethers have the following meanings.

Polyether A

A glycerol-started polyether of propylene oxide tipped with 15% ethylene oxide to an hydroxyl number of 35 and a primary hydroxyl number of approximately 75%.

Polyether B

A trimethylol propane-started polyether of propylene oxide tipped with ethylene oxide to an OH number of 34 and a primary OH group content of approximately 80%.

Polyether C

A glycerol-started polyether of propylene oxide and ethylene oxide to an OH number of 47 and a primary OH group content of less than 5%.

Polyether D

A linear polypropylene glycol with an OH number of 56 containing secondary hydroxyl groups.

EXAMPLE 1

900 gms. of polyether A at a temperature of 20° C. was blended with 48.7 gms. of triethanolamine at a temperature of 20° C. under conditions of high speed mixing 51.2 gms. of a mixture of 80% 2.4 and 20% 2.6 tolylene diisocyanate was added over a period of five seconds. 0.3 gms. of dibutyl-tin-dilaurate catalyst was then added and a fast reaction took place and the temperature of the mixture rose from 20° C. to 37° C. over a period of three minutes from the time of completion of addition of the catalyst.

On cooling the resulting stable dispersion with 10% solids had a viscosity of 1600 cps. at 25° C.

300 gms. of the above product was placed in a beaker followed by 7.8 gms. of water, 3 gms. of diethanolamine, 0.21 gms. of bis (2 dimethyl aminoethyl) ether and 1.5 gms. of Goldschmidt Silicone B8616 and stirred, the temperature being adjusted to 22° C. Next was added 0.75 gms. of dibutyl-tin-dilaurate and stirred for 10 seconds followed by the addition of 117 gms. of a mixture of 80% of 2.4 and 20% of 2.6 tolylene diisocyanate. After a further five seconds the mixture was poured into a box and expansion started. After a further 105 seconds from the end of mixing a non-shrinking 'high resilience' foam had been produced with the following properties.

| | |
|---|---|
| Density Kgs./m$^3$ | 34 |
| CLD g/cm$^2$ (1) | 28 |
| Resilience % (2) | 63 |

(1) Resistance to a compression at 40% deflection.
(2) Ball rebound %.

EXAMPLE 2

920 gms. of polyether A at 20° C. were added to a beaker and 32.1 gms. of diethanolamine at 30° C. was added at room temperature with mechanical stirring. 47.9 gms. of a mixture of 80% of 2.4 and 20% of 2.6 tolylene diisocyanate were added over a period of 30 seconds into the vortex of the stirred mixture. A white stable dispersion was formed and the temperature had risen from 20° C. to 37° C. within 30 seconds of completion of the addition of the isocyanate. The polyaddition product contained isocyanate and alkanolamine in the molar ratio of 0.9 to 1.0 and the final product contained 8.0% of the polyaddition product in polyether polyol and had an acceptable viscosity at ambient temperature.

300 gms. of the above product was placed in a beaker followed by 7.8 gms. of water, 3 gms. of diethanolamine, 0.21 gms. of bis (2 dimethyl aminoethyl) ether and 1.5 gms. of Goldschmidt Silicone B8616 and stirred, the temperature being adjusted to 22° C. Next was added 0.75 gms. of dibutyl-tin-dilaurate and stirred for 10 seconds followed by the addition of 117 gms. of a mixture of 80% of 2.4 and 20% of 2.6 tolylene diisocyanate. After a further five seconds the mixture was poured into a box and expansion started. After a further 105 seconds from the end of mixing a non-shrinking 'high resilience' foam had been produced with properties similar to Example 1.

EXAMPLE 3

A foam was prepared according to the method as described in Example 2 except that 300 gms. of the polyaddition product in polyether polyol was replaced by 300 gms. of the polyether polyol (polyether A) and only 100 gms. of the isocyanate was used. Expansion to produce a foam took place as in Example 2 except that the resulting foam shrank, the properties being unmeasurable.

EXAMPLE 4

The polyaddition product in polyether polyol was prepared using polyether A according to Example 2 and was foamed also according to Example 2 except that all of the dibutyl-tin-dilaurate was replaced by 0.6 gms. of stannous octoate. A non-shrinking foam was obtained of the high resilience type with properties similar to those of Example 1.

EXAMPLE 5

A polyaddition product was prepared and foamed according to Example 2 except that the polyether A was replaced with polyether B. The stable dispersion in polyether polyol had a solids content of 8% and an acceptable viscosity of ambient temperature. The resulting foam was non-shrinking and had properties similar to those of Example 1.

EXAMPLE 6

A polyaddition product in polyether A was prepared according to Example 2 except that the molar ratio of isocyanate to alkanolamine was 1.1 to 1.0, the total solids content remaining at 8%. The resulting product had a high but usable viscosity in excess of 2500 cps. at 25° C. Foaming according to Example 2 gave a high resilience non-shrinking foam.

EXAMPLE 7

A polyaddition product in polyether A was prepared according to Example 2 except that the molar ratio of isocyanate to alkanolamine was 0.45 to 1.0 and the total solids content was 8%. Foaming according to Example 2 gave a shrinking foam. The properties of this foam could not be measured.

EXAMPLE 8

A polyaddition product was produced by taking 920 gms. of polyether A at a temperature of 20° C. and mixing with 24.5 gms. diethanolamine at a temperature of 30° C. followed by 55.5 gms. of crude MDI with vigorous agitation. A polyaddition product in a polyether polyol was obtained having a solids content of 8% and a usable but high viscosity in excess of 3000 cps. at 25° C.

The product was foamed according to Example 2 giving a non-shrinking foam of the high resilience type.

EXAMPLE 9

A stable dispersion in polyether C at a temperature of 20° C. was prepared by taking 800 gms. of polyether C and adding 80.24 gms. of diethanolamine at a temperature of 30° C. which was stirred at high speed prior to and during the addition of 119.75 gms. of a mixture of 80% 2,4 and 20% 2,6 tolylene diisocyanate which took place over a period of one minute. A temperature rise of 29° C. was observed and the product on cooling had an acceptable viscosity at ambient temperature and a solids content of 20%.

EXAMPLE 10

A stable dispersion was prepared according to Example 9 except that polyether C was replaced by polyether D. The resulting polyaddition compound in polyether D had a solids content of 20% and an acceptable viscosity at ambient temperature.

The stable dispersion produced in accordance with the foregoing Examples 1, 2, 5–10 are of a non-ionic nature. That is, the dispersions contain covalent polymeric substances which are devoid of ionic groups. Moreover, substantially no water or other ionic medium is used in the preparation of (nor is present in) the dispersions. In this latter respect the presence of traces of water, such as will tend to be contained in commercially available polyols and other starting materials, may be acceptable although in general the presence of water is undesirable and should be kept at as low a level as possible. Preferably the water content should not be greater than 1% by weight and most preferably the content is very much less than this, say below 0.1%, although it is to be understood that in some circumstances it may be possible to operate the process of the invention at water levels above 1%.

The polyols used in performing the process of the invention may be of the triol kind containing predominantly primary hydroxyl groups in so far as such polyols are of particular use as starting materials for the formation of polyurethane foams. However, since the production of polymer-modified polyols in accordance with the process of the invention, and particularly the production dispersions as described in the above Examples, involves reaction of the isocyanate wholly or predominantly with the olamine with the polyol acting wholly or predominantly as an unreacted carrier, it will be appreciated that it is possible to use any suitable polyol selected in particular in accordance with the requirements of a subsequent polyurethane-forming reaction in which the polymer-modified polyol is to be used. Thus for example polyols which are triols and/or diols and which have primary and/or secondary hydroxyl groups or any other suitable structures may be used.

I claim:

1. A method of forming a polymer-modified polyol, comprising polymerising a starting material with an organic polyisocyanate in the presence of a polyol with the polyol acting at least predominantly as an unreacted carrier, the starting material being triethanolamine and the triethanolamine reacting at least predominently polyfunctionally with the isocyanate.

2. A method according to claim 1, wherein the alkanolamine and the isocyanate are mixed in the molar ratio of about 1/0.5 to 1/1.5 in the presence of a polyether polyol having a molecular weight in the range of 200 to 10,000 and the reacted alkanolamine and polyisocyanate together constitute 1% to 35% by weight based on the weight of the polyol.

3. A method according to claim 2, wherein the alkanolamine and the isocyanate are reacted in the molar ratio of 1/0.8 to 1/1.1.

4. A method according to claim 1, wherein the alkanolamine and the isocyanate are reacted in a molar ratio in excess of 1/1.6 in the presence of a chain capping agent.

5. A method according to claim 1, wherein the total weight of the alkanolamine and the polyisocyanate is greater than 10% based on the weight of the polyol and after polymerisation of the alkanolamine with the isocyanate further polyol is added to dilute the polymer-modified polyol.

6. A method according to claim 1, wherein a catalyst is mixed with the alkanolamine and the polyisocyanate to catalyse the said polymerisation reaction therebetween.

7. A method according to claim 6, wherein said catalyst is selected from organometallics and amines.

8. A polymer-modified polyol comprising a polyol and a polyaddition product resulting from the reaction of triethanolamine at least predominantly polyfunctionally with an organic polyisocyanate.

9. A polymer-modified polyol according to claim 8, which is a stable dispersion.

10. A polymer-modified polyol according to claim 8, wherein the polyol is a polyether polyol having a molecular weight in the range of 200 to 10,000 and the polyaddition product constitutes 1% to 35% by weight based on the polyol.

11. A method of forming a polyurethane wherein an isocyanate is reacted with a preformed polymer-modified polyol, said polymer-modified polyol comprising a polyol and a polyaddition product resulting from the reaction of an olamine at least predominantly polyfunctionally with an organic polyisocyanate.

12. A method according to claim 11, wherein said polymer-modified polyol is in the form of a stable dispersion.

13. A method according to claim 11, wherein the said polyaddition product is formed using an olamine which is an alkanolamine.

14. A method according to claim 13, wherein the said polyaddition product is formed using triethanolamine.

15. A method according to claim 11, wherein the isocyanate which reacts with the polyol is the same as that used in forming the polymer-modified polyol.

16. A polyurethane foam material formed by the reaction of a polyol and an isocyanate in the presence of a blowing agent and containing a polyaddition product resulting from the reaction of an olamine at least predominantly polyfunctionally with an organic polyisocyanate.

17. A polyurethane according to claim 16, wherein the polyaddition product is formed using an olamine which is an alkanolamine.

18. A polyurethane according to claim 17, wherein the polyaddition product is formed using triethanolamine.

19. A method of forming a polymer-modified polyol, comprising polymerising a starting material with an organic polyisocyanate in the presence of a polyol containing predominantly primary hydroxy groups with the polyol acting at least predominantly as an unreacted carrier, the starting material being an olamine and the olamine reacting at least predominantly polyfunctionally with the isocyanate.

20. A method according to claim 19, wherein the olamine is an alkanolamine.

21. A method according to claim 20, wherein the alkanolamine is triethanolamine.

22. A method according to claim 19, wherein the olamine reacts with the isocyanate with substantially no water present.

23. A method according to claim 19, wherein a catalyst is mixed with the alkanolamine and the polyisocyanate to catalyse the said polymerisation reaction therebetween.

24. A method according to claim 19, wherein said catalyst is selected from organometallics and amines.

25. A polymer-modified polyol comprising a polyol containing predominantly primary hydroxyl groups and a nonionic polyaddition product resulting from the reaction of an olamine at least predominantly polyfunctionally with an organic polyisocyanate.

26. A method according to claim 25, wherein said preformed polymer-modified polyol is of a non-ionic nature.

27. A method according to claim 26, wherein said polyaddition product results from said reaction of said olamine with said organic polyisocyanate with substantially no water present.

28. A method according to claim 25, wherein said isocyanate is reacted with said preformed polymer-modified polyol in the presence of a blowing agent thereby to produce polyurethane foam material.

29. A polyurethane formed by the reaction of a polyol and an isocyanate and containing a polyaddition product resulting from the reaction of triethanolamine at least predominantly polyfunctionally with an organic polyisocyanate.

* * * * *